United States Patent
Myles et al.

(10) Patent No.: US 8,302,210 B2
(45) Date of Patent: Oct. 30, 2012

(54) SYSTEM AND METHOD FOR CALL PATH ENFORCEMENT

(75) Inventors: Ginger M. Myles, San Jose, CA (US);
Srinivas Vedula, Santa Clara, CA (US);
Gianpaolo Fasoli, Palo Alto, CA (US);
Julien Lerouge, Santa Clara, CA (US);
Tanya Michelle Lattner, San Jose, CA (US); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 544 days.

(21) Appl. No.: 12/546,520

(22) Filed: Aug. 24, 2009

(65) Prior Publication Data
US 2011/0047622 A1     Feb. 24, 2011

(51) Int. Cl.
*G06F 21/00*     (2006.01)
(52) U.S. Cl. .............. 726/30; 726/26; 380/44; 711/163; 719/331
(58) Field of Classification Search .................. None
See application file for complete search history.

(56) References Cited

U.S. PATENT DOCUMENTS

| | | | | |
|---|---|---|---|---|
| 6,163,882 | A * | 12/2000 | Masuyama et al. | 717/154 |
| 7,181,603 | B2 | 2/2007 | Rothrock et al. | |
| 2002/0013907 | A1 | 1/2002 | May | |
| 2007/0169068 | A1 | 7/2007 | Kanazawa et al. | |
| 2007/0204257 | A1* | 8/2007 | Kinno et al. | 717/100 |
| 2008/0215862 | A1* | 9/2008 | Haga et al. | 712/227 |
| 2008/0250216 | A1 | 10/2008 | Kershaw et al. | |
| 2009/0077415 | A1 | 3/2009 | Kay et al. | |
| 2010/0146624 | A1* | 6/2010 | Meyer et al. | 726/23 |

FOREIGN PATENT DOCUMENTS
WO     2008/074483 A1     6/2008

OTHER PUBLICATIONS
N. Cohen, "Enforcing function call order in C°°", The Code Project, Sep. 29, 2003, p. 1-8, Accessed on Mar. 5, 2012, [http://www.codeproject.com/Articles/5086/Enforce-function-call-order-in-C?display=Print].*

Mircosoft, "What is a DLL", Dec. 4, 2007, p. 2-7 Accessed on Mar. 7, 2012, [http://support.microsoft.com/kb/81565].*

* cited by examiner

*Primary Examiner* — Jason K. Gee
*Assistant Examiner* — Robert Leung
(74) *Attorney, Agent, or Firm* — Novak Druce + Quigg LLP

(57) ABSTRACT

Disclosed herein are systems, computer-implemented methods, and computer-readable storage media for call path enforcement. The method includes tracking, during run-time, a run-time call order for a series of function calls in a software program, and when executing a protected function call during run-time, allowing or causing proper execution of a protected function call only if the run-time call order matches a predetermined order. The predetermined order can be an expected run-time call order based on a programmed order of function calls in the software program. The method can include maintaining an evolving value associated with the run-time call order and calling the protected function by passing the evolving value and function parameters corrupted based on the evolving value. The protected function uncorrupts the corrupted parameters based on the passed evolving value and an expected predetermined call order. A buffer containing the uncorrupted parameters can replace the corrupted parameters.

15 Claims, 5 Drawing Sheets

SYSTEM AND METHOD FOR CALL PATH ENFORCEMENT

BACKGROUND

1. Technical Field

The present disclosure relates to preventing unauthorized calls to software routines and more specifically to preventing direct calls into a function without calling the instructions that should be executed beforehand in a specific order.

2. Introduction

Software programs typically include a main routine or main program which calls various subroutines or libraries. Often, the functionality of these subroutines and libraries depends on certain steps being performed beforehand. In other cases, a software developer desires to protect the functionality of these subroutines and libraries from unauthorized execution, but is unable to do so given available security approaches.

For example, a media player application includes a main program with libraries and subroutines to manage different aspects of playing media such as reading media files, managing media libraries, visualizations, audio playback libraries, equalizer controls, extracting metadata from media files, and accessing protected media files. The software developer desires to prevent unauthorized direct calls into the subroutine to access protected media files and/or any other sensitive subroutines or libraries while still allowing the media player application to use the sensitive routines and libraries as intended. The software developer can also desire to prevent direct access to the equalizer controls without first loading the audio playback libraries.

Current approaches are inadequate to address these needs in this and a myriad of similar situations.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, computer-implemented methods, and computer-readable storage media for call path enforcement. A system configured to practice the method tracks via a processor, during run-time, a run-time call order for a series of function calls in a software program, and when executing a protected function call during run-time, allows proper execution of a protected function call only if the run-time call order matches a predetermined order. The predetermined order can be an expected run-time call order based on a programmed order of function calls in the software program. In each of the three following variations on the core concept, the system further maintains an evolving value associated with the run-time call order. In the first parameter corruption variation, the system corrupts a subset of function parameters associated with the protected function based on the evolving value prior to calling the protected function, calls the protected function and passes the evolving value and the corrupted subset of function parameters to the protected function, uncorrupts the corrupted parameters based on the passed evolving value and the predetermined call order while inside the protected function, and executes the protected function based on the uncorrupted parameters. In the second variation, the system marshals parameters in a parameter buffer which is passed to the subroutine or library. The system places a subset of function parameters associated with the protected function in a buffer, wherein the subset of function parameters are arranged in the buffer based on the evolving value and the run-time call order, calls the protected function and passing the evolving value and the buffer to the protected function, extracts the subset of function parameters from the buffer based on the evolving value and the predetermined call order while inside the protected function, and executes the protected function based on the extracted parameters.

The system in the third variation marshals parameters in a global buffer. The system combines the run-time call order and the evolving value to determine indices into a global buffer for a subset of function parameters, places the subset of function parameters associated with the protected function in the global buffer (the subset of function parameters are arranged in the global buffer based on the determined indices) calls the protected function and passes the evolving value to the protected function, extracts the subset of function parameters from the global buffer based on the evolving value and the predetermined call order while inside the protected function, and executes the protected function based on the extracted subset of function parameters. A main software function can perform all or part of these steps. A subroutine or library can perform some or all of these steps. Both the main function and the subroutine/library aspects are within the scope of this disclosure.

In one embodiment, a system for including call path enforcement instructions in computer code includes a processor, a calculation module configured to control the processor to calculate a predetermined run-time call order for a series of function calls in computer code, the computer code including a protected function, and an insertion module configured to control the processor to insert instructions in the computer code which, when executed by a computing device, allow proper execution of the protected function only if an actual run-time call order matches the predetermined run-time call order. The system can include a compiling module configured to control the processor to compile the computer code with the inserted instructions to a binary. The insertion module can be further configured to control the processor to insert the instructions in multiple locations throughout the computer code, potentially spanning the main function and/or multiple libraries and subroutines. The three approaches outlined above also apply to this embodiment.

In another aspect, a computer-readable storage medium stores a computer program having program instructions for controlling a processor to perform certain steps, the program instructions being embedded with call path enforcement instructions. The call path enforcement instructions, when executed by the processor, cause the processor to track during run-time of the computer program a run-time call order for a series of function calls in the computer program, and allow proper execution of a protected function call only if the tracked run-time call order matches a predetermined order. The three approaches outlined above also apply to this embodiment.

In another embodiment, a computer-readable storage medium stores a computer program having instructions for controlling a processor to embed call path enforcement instructions in a compiled application. The instructions include calculating a predetermined run-time call order for a series of function calls in computer code, the computer code including a protected function, and embedding instructions throughout the computer code which, when executed by a computing device, allow or cause proper execution of the protected function only if an actual run-time call order matches the predetermined run-time call order. The computer program can be a dynamic-link library, a function, and/or a sub-routine. The predetermined run-time call order can include function calls spanning multiple routines in the computer program. The three approaches outlined above also apply to this embodiment.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
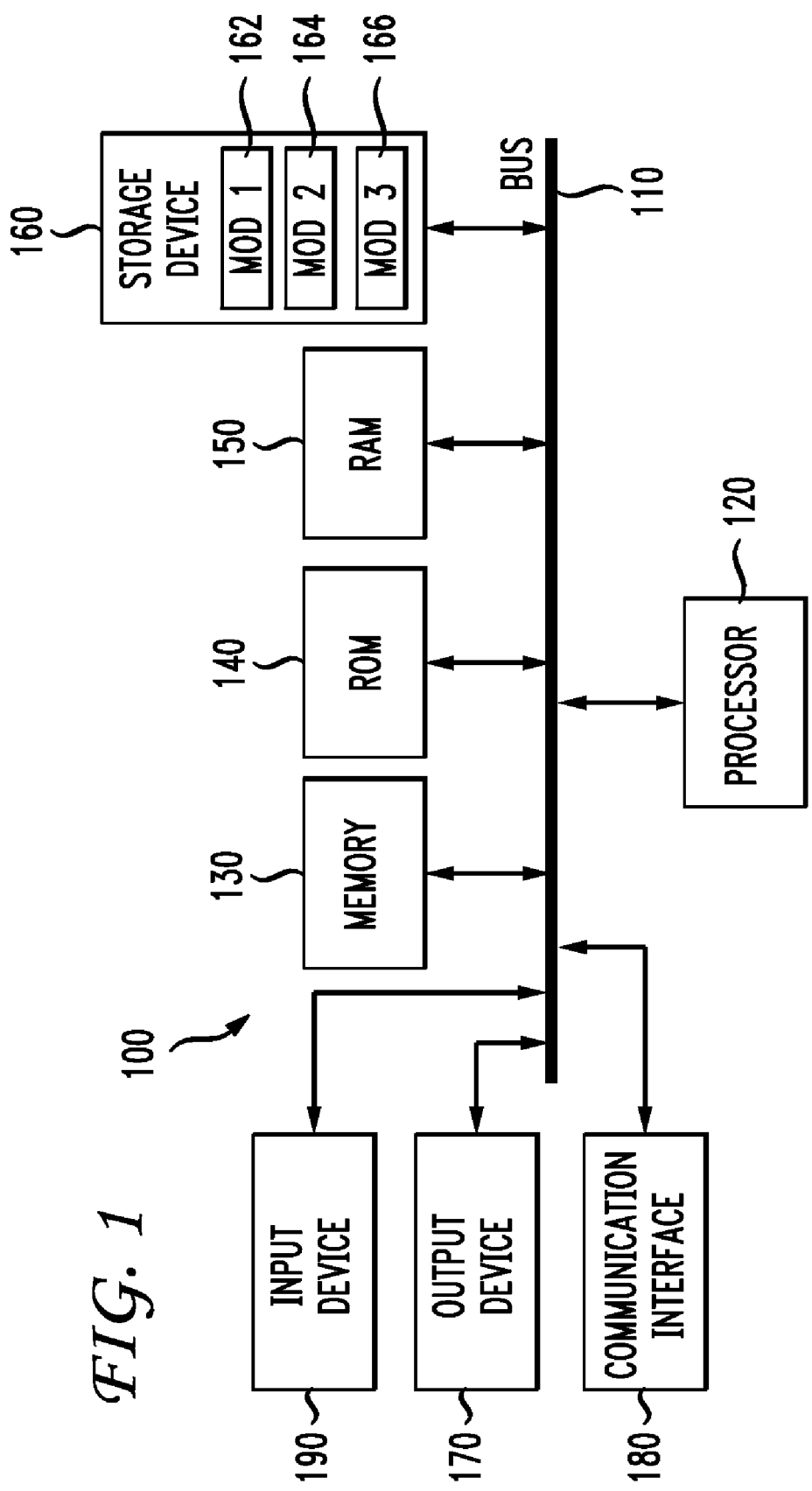
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
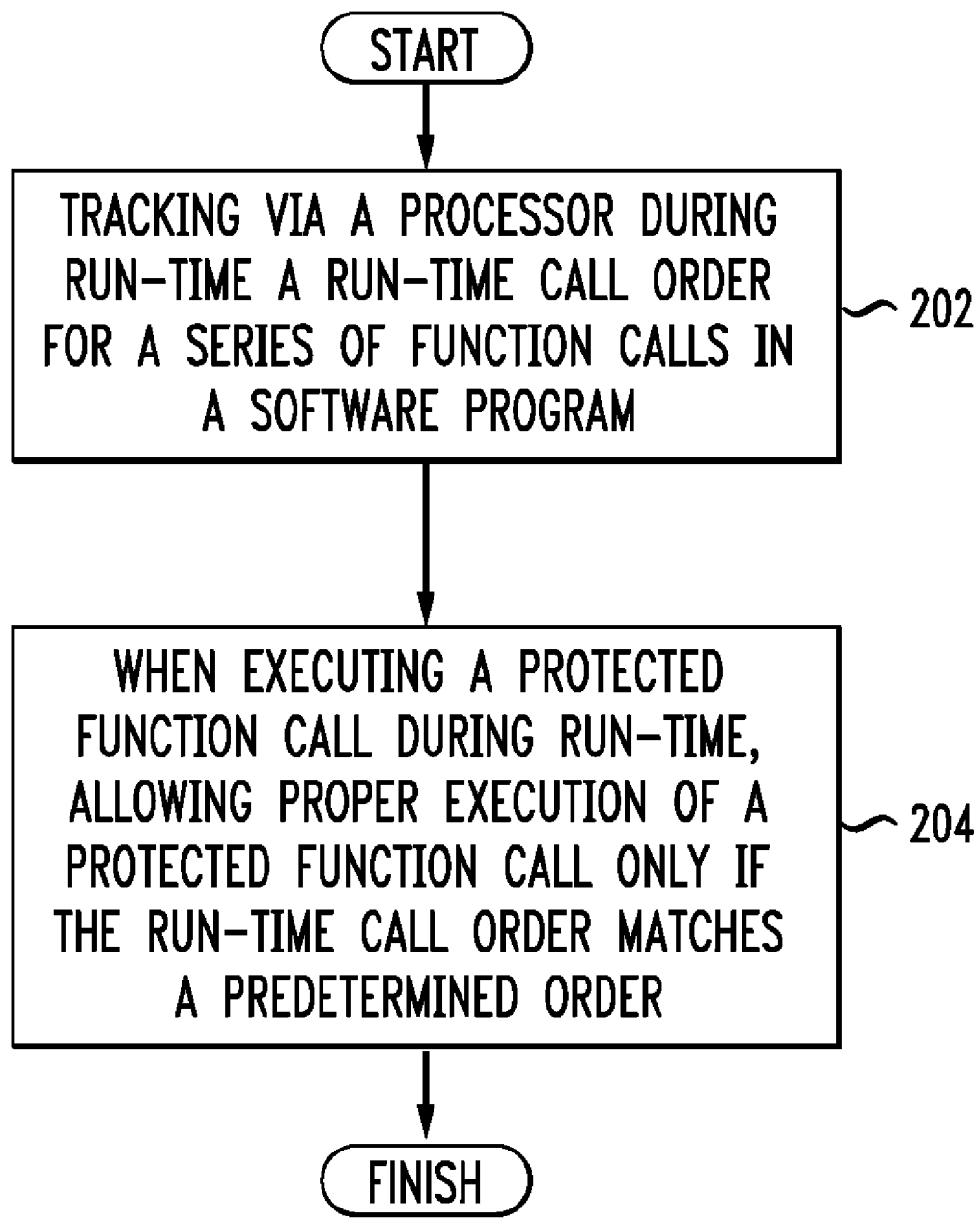
FIG. 2 illustrates an example method embodiment.

Having disclosed some basic system components, the disclosure now turns to the exemplary method embodiment shown in FIG. 2. For the sake of clarity, the method is discussed in terms of an exemplary system 100 as shown in FIG. 1 configured to practice the method.

FIG. 2 illustrates an example method embodiment for call path enforcement. A system 100 configured to practice the method first tracks via a processor 120, during run-time, a run-time call order for a series of function calls in a software program (202). One way in which the system 100 can track a run-time call order is to maintain an evolving value associated with the run-time call order. The evolving value can be one or more variables of virtually any simple or complex type, such as Boolean, integer, string, linked list, database, character, array, stack, etc.

When executing a protected function call during run-time, the system 100 allows or causes proper execution of a protected function call only if the run-time call order matches a predetermined order (204). A programmer or an automated entity can mark certain functions as protected in the source code, in a compiled binary, and/or in any stage in between. The system can simple allow execution and/or actually execute the protected function properly or initiate a series of steps which lead to executing the protected function properly. The predetermined order can be an expected run-time call order based on a programmed order of function calls in the software program. The expected run-time call order can correspond to an order in which the program would execute if operated in the manner intended by the programmer. For example, if a particular software application requires a series of setup steps before accessing a digital key, the expected run-time call order can correspond to that series of setup steps in the exact programmed order. If an attacker or other unauthorized entity calls the protected function without executing all the setup steps in the programmed order, the protected function can return an error, allow only reduced functionality execution of the protected function, corrupt data used by the computer program, and/or take other actions as needed.

Three basic variations of this fundamental approach exist. In the first variation, the system 100 corrupts a subset of function parameters associated with the protected function based on the evolving value prior to calling the protected function, calls the protected function and passes the evolving value and the corrupted subset of function parameters to the protected function. While inside the protected function, the system 100 uncorrupts the corrupted parameters based on the passed evolving value and the predetermined call order and executes the protected function based on the uncorrupted parameters. The protected function can uncorrupt the corrupted parameters by recalculating the call order and combining it with the evolving value.

In the second variation, the system 100 places a subset of function parameters associated with the protected function in a buffer, wherein the subset of function parameters are arranged or copied in the buffer based on the evolving value and the run-time call order and calls the protected function, and passes the evolving value and the buffer to the protected function. While inside the protected function, the system 100 extracts the subset of function parameters from the buffer based on the evolving value and the predetermined call order while inside the protected function and executes the protected function based on the extracted parameters.

In the third variation, the system 100 combines the run-time call order and the evolving value to determine indices into a global buffer for a subset of function parameters, places the subset of function parameters associated with the protected function in the global buffer (the subset of function parameters are arranged in the global buffer based on the determined indices) and calls the protected function and passes the evolving value to the protected function. While inside the protected function, the system 100 extracts the subset of function parameters from the global buffer based on the evolving value and the predetermined call order, and executes the protected function based on the extracted subset of function parameters.

In a system embodiment, a system 100 such as a compiler or post processing tool running on a processor within a computing device includes or embeds call path enforcement instructions in computer code. Computer code can include human-readable source code, compiled machine-executable object code, and/or any other intermediate representations of the source code or compiled code. Such a system includes a processor, a calculation module configured to control the processor to calculate a predetermined run-time call order for a series of function calls in computer code, the computer code including a protected function, and an insertion module configured to control the processor to insert instructions in the computer code which, when executed by a computing device, allow proper execution of the protected function only if an actual run-time call order matches the predetermined run-time call order. The compiler or post processing tool can also compile the computer code with the inserted instructions to a binary executable or binary library. The predetermined run-time call order can be an expected run-time call order based on a programmed order of function calls in the computer code. The insertion module can control the processor to insert the instructions in multiple locations throughout the computer code, including a main program module, multiple libraries, and/or subroutines. In this manner, the approach is distributed throughout the code or the compiled binary and the protection scheme is more difficult to detect and/or break. The inserted instructions can include instructions to maintain an evolving value associated with the actual run-time call order.

In one variation, the module configured to control the processor to insert instructions in the computer code inserts the following instructions in the computer code but not in the protected function: corrupting a subset of function parameters associated with the protected function based on the evolving value prior to calling the protected function, and calling the protected function and passing the evolving value and the corrupted subset of function parameters to the protected function. The module configured to control the processor to insert instructions in the computer code also inserts instructions in the protected function to uncorrupt the passed corrupted subset of function parameters based on the passed evolving value and the predetermined call order while inside the protected function.

In another variation, the module configured to control the processor to insert instructions in the computer code inserts the following instructions in the computer code but not in the protected function: placing a subset of function parameters associated with the protected function in a buffer, wherein the subset of function parameters are arranged in the buffer based on the evolving value and the run-time call order, and calling the protected function and passing the evolving value and the buffer to the protected function. The module configured to control the processor to insert instructions in the computer code also inserts instructions in the protected function to extract the subset of function parameters from the buffer based on the evolving value and the predetermined call order while inside the protected function.

In yet another variation, the module configured to control the processor to insert instructions in the computer code inserts the following instructions in the computer code but not in the protected function: combining the run-time call order and the evolving value to determine indices into a global buffer for a subset of function parameters, placing the subset of function parameters associated with the protected function in the global buffer (wherein the subset of function parameters are arranged in the global buffer based on the determined indices) and calling the protected function and passing the evolving value to the protected function. The module configured to control the processor to insert instructions in the computer code also inserts instructions in the protected function to extract the subset of function parameters from the global buffer based on the evolving value and the predetermined call order while inside the protected function.

A computer-readable storage medium can store a computer program having program instructions for controlling a processor to perform certain steps, the program instructions being embedded with call path enforcement instructions. The call path enforcement instructions, when executed by the processor, cause the processor to track during run-time of the computer program a run-time call order for a series of function calls in the computer program, and allows or causes proper execution of a protected function call only if the tracked run-time call order matches a predetermined order.

A computer-readable storage medium can store a computer program having instructions for controlling a processor to embed call path enforcement instructions in a compiled application. The instructions include calculating a predetermined run-time call order for a series of function calls in computer code, the computer code including a protected function, and embedding instructions throughout the computer code which, when executed by a computing device, allow or implement proper execution of the protected function only if an actual run-time call order matches the predetermined run-time call order. The computer program can be a dynamic-link library. The predetermined run-time call order can include function calls spanning multiple routines in the computer program.

Figure 3:
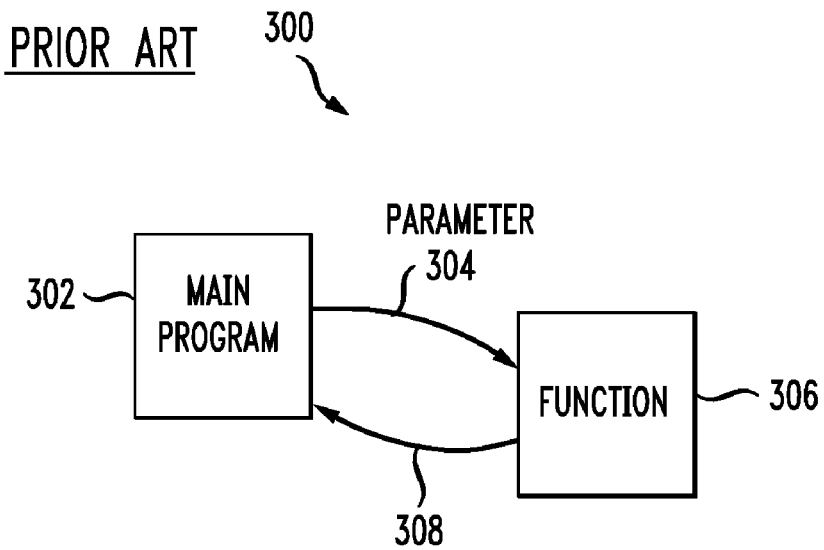
FIG. 3 illustrates a prior art approach to calling functions.

FIG. 3 illustrates a prior art approach 300 to calling functions. In the prior art, a main program 302 directly calls a function 306 or library by passing parameters 304 to the function 306. The function 306 receives the parameters 304 and executes the function code. The function then returns control 308 to the main program 302 and in some cases passes a return value (not shown) to the main program 302 as a result. A malicious or unauthorized user or software module can directly call the function 306. Using this traditional approach, a software developer has only limited ability to prevent direct calls into the function 306.

Figure 4:
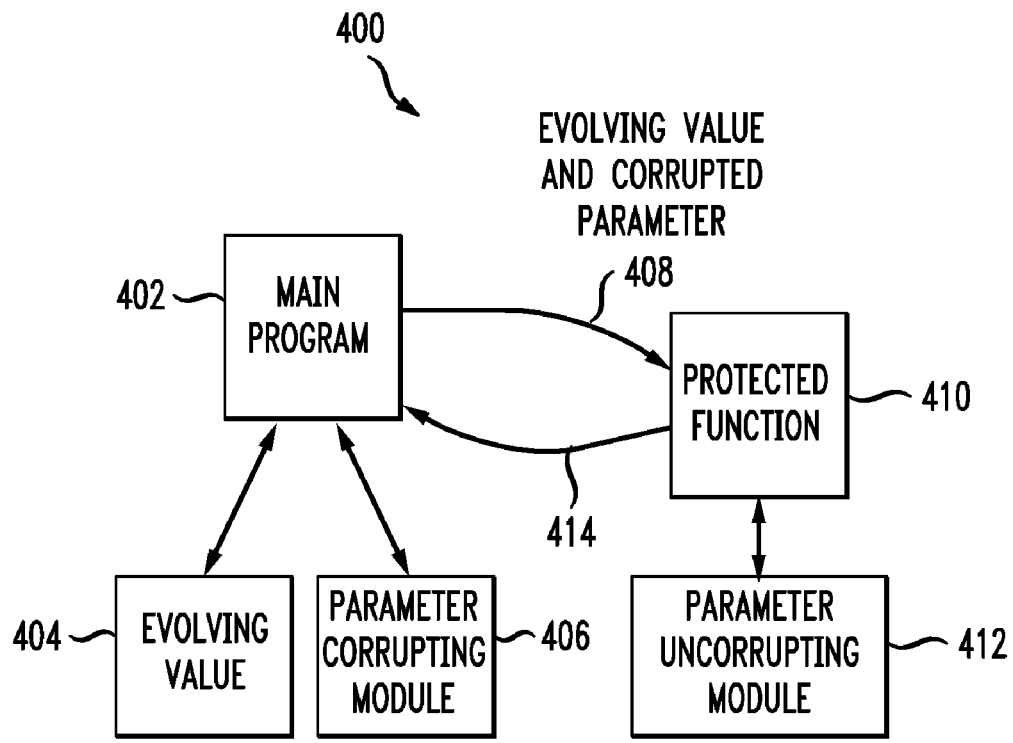
FIG. 4 illustrates a parameter corruption approach to call path enforcement when calling a function.

FIG. 4 illustrates a parameter corruption approach to call path enforcement when calling a function. In this approach 400, the main program 402 maintains an evolving value 404 which reflects the actual run-time call order of instructions in the main program 402. The evolving value 404 can also reflect the run-time call order of other called functions or libraries. When the main program 402 prepares to call the protected function 410, the main program 402 first passes the desired parameters and the evolving value to a parameter corrupting module 406 which corrupts, encrypts, and/or masks the parameters in such a way that the protected function 410 can recover the original values if given the correct evolving value. The parameter corrupting module can be a separate software library, it can be instructions embedded directly in the main program, or some combination.

The main program 402 passes the evolving value and the corrupted parameters 408 to the protected function 410. The protected function 410 passes the evolving value and the corrupted parameters 408 to a parameter uncorrupting module 412. The parameter uncorrupting module 412 can be an automatically invoked part of the protected function 410. The parameter uncorrupting module 412 can be a separate subroutine, function, or library, or it can be embedded as instructions in the protected function. In one aspect, the protected function 410 includes the necessary portions of the parameter uncorrupting module 412 at various points throughout the protected function 410 or just before a corrupted parameter is used. The protected function 410 performs its operations as intended if the main program 402 executed an expected call path leading up to calling the protected function 410. The protected function 410 then returns control 414 to the main program 402. In one variation, the main program 402 does not pass the evolving value 404 to the protected function 410. Instead, the protected function 410 relies on an expected call order within the parameter uncorrupting module 412. While the main program 402 does not pass the evolving value in this variation, the effects of evolving value are passed in the form of the corrupted parameters from which the parameter uncorrupting module 412 can extract the correct parameters based on an expected call path.

Figure 5:
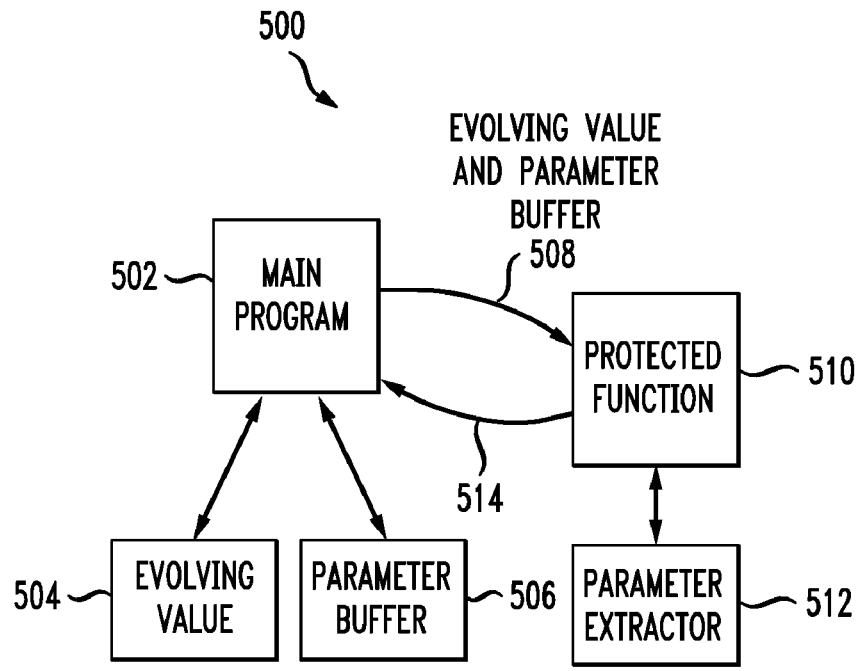
FIG. 5 illustrates an approach to call path enforcement when calling a function which marshals parameters in a passed parameter buffer.

FIG. 5 illustrates an approach to call path enforcement when calling a function which marshals parameters in a passed parameter buffer. In this approach 500, the main program 502 maintains an evolving value 504 which reflects the actual run-time call order of instructions in the main program 502. The evolving value 504 can also reflect the run-time call order of other called functions or libraries. When the main program 502 prepares to call the protected function 510, the main program 502 first corrupts, encrypts, and/or masks and/or inserts the desired parameters into a parameter buffer 506 in such a way that the protected function 510 can recover the original values from the parameter buffer if given the correct evolving value or if based on an expected call order. The main program 502 can insert the parameters at determined indices in the parameter buffer based on the evolving value 504.

The main program 502 passes the evolving value and the parameter buffer 508 to the protected function 510. The main program 502 can also pass just the parameter buffer if the protected function 510 already has an expected call path represented by an expected evolving value 504. The protected function 510 passes the evolving value and/or the corrupted parameters 508 to a parameter extractor 512. The parameter extractor 512 can be an automatically invoked part of the protected function. The parameter extractor 512 can be a separate subroutine, function, or library, or it can be embedded as instructions in the protected function 510. In one aspect, the protected function 510 includes the necessary portions of the parameter extractor 512 at various points throughout the protected function 510 or just before a corrupted parameter is used. The protected function 510 performs its operations as intended if the main program 502 executed an expected call path leading up to calling the protected function 510. The protected function 510 then returns control 514 to the main program 502. In one variation, the main program 502 does not pass the evolving value 504 to the protected function 510. Instead, the protected function 510 relies on an expected call order within the parameter uncorrupting module 512. While the main program 502 does not pass the evolving value in this variation, the effects of evolving value are passed in the form of the corrupted parameters from which the parameter extractor 512 can extract the correct parameters based on an expected call path.

Figure 6:
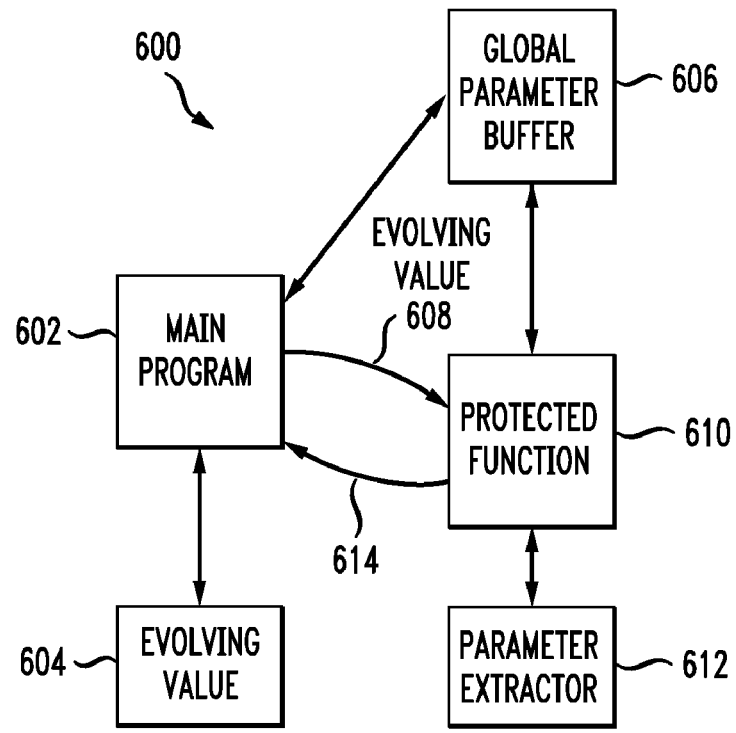
FIG. 6 illustrates an approach to call path enforcement when calling a function which marshals parameters in a global parameter buffer.

FIG. 6 illustrates an approach to call path enforcement when calling a function which marshals parameters in a global buffer. In this approach 600, the main program 602 maintains an evolving value 604 which reflects the actual run-time call order of instructions in the main program 602. The evolving value 604 can also reflect the run-time call order of other called functions or libraries. When the main program 602 prepares to call the protected function 610, the main program 602 first corrupts, encrypts, and/or masks and/or inserts the desired parameters into a global buffer 606 in such a way that the protected function 610 can recover the original values from the parameter buffer if given the correct evolving value or if based on an expected call order. The main program 602 can insert the parameters at determined indices in the global buffer based on the evolving value 604.

The main program 602 passes the evolving value 608 to the protected function 610. The main program 602 can also call the protected function 610 directly without the evolving value if the protected function 610 already has an expected call path represented by an expected evolving value 604. The protected function 610 uses the parameter extractor 612 to determine indices into the global parameter buffer for the expected parameters and retrieve the expected parameters. The parameter extractor 612 can be an automatically invoked part of the protected function. The parameter extractor 612 can be a separate subroutine, function, or library, or it can be embedded as instructions in the protected function 610. In one aspect, the protected function 610 includes the necessary portions of the parameter extractor 612 at various points throughout the protected function 610 or just before a corrupted parameter is used. The protected function 610 performs its operations as intended if the main program 602 executed an expected call path leading up to calling the protected function 610. The protected function 610 then returns control 614 to the main program 602. In one variation, the protected function 610 relies on an expected call order within the parameter uncorrupting module 612. While the main program 602 does not pass the evolving value in this variation, the effects of evolving value are passed in the form of the corrupted parameters and/or parameter indices from which the parameter extractor 612 can extract the correct parameters based on an expected call path as represented by the evolving value.

In any of these approaches, the main program 402, 502, 602 can corrupt some or all of the parameters to pass to the function. The evolving value can be based on one or more other factors in addition to an expected call path, such as a date or time, a unique computer identifier, a unique user identifier, a password, a location, a cryptographic key, etc.

In another variation, a software developer overloads the protected function by declaring multiple instances of the protected function with different sets of parameters, where only one of the multiple declared instances includes the parameter uncorrupting module or the parameter extractor. The remaining instance(s) of the protected function can return an error indicating that the function is not to be called outside of its intended function. For instance, one instance of the protected function which does not include the parameter uncorrupting instructions can be declared as shown below:

bool ProtectedFunction(int param1, char* param2, float param3).

An overloaded instance of the same protected function which does include the parameter uncorrupting instructions can be declared as shown below:

bool ProtectedFunction(int param1, char* param2, float param3, bool isProtected).

In this case, if the protected function is called without the fourth Boolean parameter isProtected, the protected function does not behave as expected, returns an error, and/or produces garbage output. However, if the protected function is called with the properly corrupted parameters and the fourth Boolean parameter, the correct overloaded function is invoked which can uncorrupt the parameters and perform the expected behavior.

If the main program 402, 502, 602 passes the evolving value 404, 504, 604 to the protected function 410, 510, 610, the main program can pass the evolving value by reference to the protected function. In this way, the protected function not only uncorrupts its own parameters based on a prior expected call path as represented by the evolving value, the protected function can also update the evolving value for use in other, later calls to protected functions.

Figure 7:
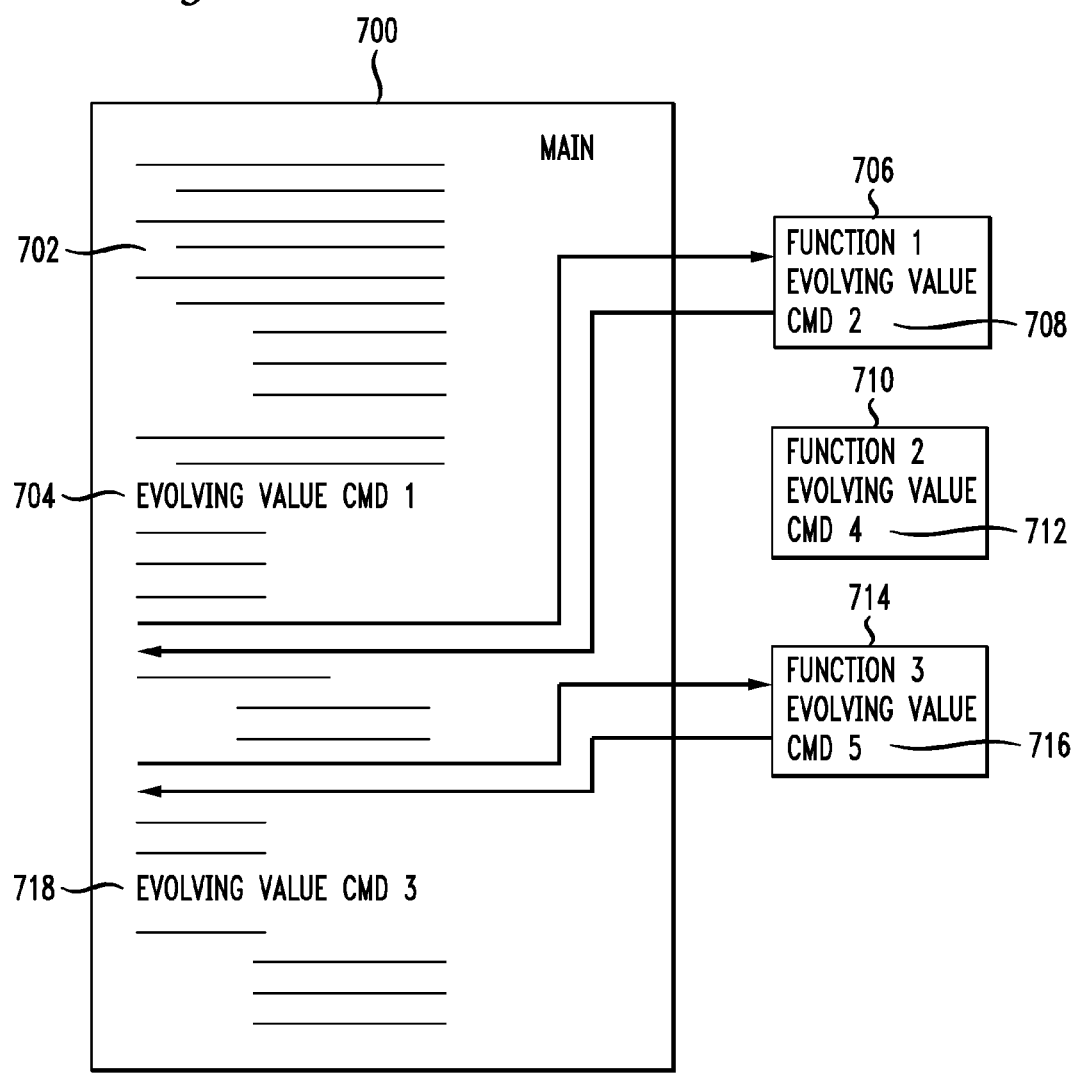
FIG. 7 illustrates source code which maintains an evolving value associated with the run-time call order.

FIG. 7 illustrates source code 700 of a main program 702 which maintains an evolving value associated with the run-time call order. The run-time call order is reflected by the evolving value which is updated by the various evolving value commands. The program 702 includes several functions, subroutines, or libraries called function 1 706, function 2 710, and function 3 714. The main program 702 executes an evolving value command 1 704, then executes function 1 706. Function 1 706 expects a particular evolving value based on evolving value command 1 704. Function 1 706 also executes evolving value command 2 708 before returning control to the main program 702. Later the main program 702 calls or executes function 3 714. Function 3 714 expects a particular evolving value based on evolving value commands 1 and 2 704, 708. As part of its instructions, function 3 714 executes evolving value command 5 716 before returning control to the main program 702. The main program 702 then executes evolving value command 3 718. A subsequent function would expect an evolving value based on the evolving value commands 1, 2, and 5 704, 708, 716, in that order. Note that some functions and evolving value commands are not executed in this particular embodiment, such as function 2 710 and evolving value command 4 712. The evolving value commands can be separate lines of code or can be integrated into existing code, such as being integrated into a C style for-loop, as shown below:

```
for (j = 0; j < 512; j++, updateEvolvingValue( )){
    forLoopInstruction1( );
    forLoopInstruction2( );
    ...
}
```

In one aspect, a software developer manually annotates protected functions and calculates the expected evolving value. However, an automated tool can perform all or part of this process as part of a compiler, a pre-processing tool, and/or a post-processing tool. The techniques described herein may be advantageously combined with other obfuscation and software hardening techniques.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computer-implemented method for call path enforcement, the method comprising:
   tracking via a processor, during run-time, a first run-time call order for a series of function calls in a software program;
   maintaining an evolving value associated with the first run-time call order;
   transforming a subset of function parameters associated with a protected function based on the first run-time call order and the evolving value prior to calling the protected function;
   calling the protected function;
   generating a second run-time call order by re-calculating the series of function calls inside the protected function;
   un-transforming the subset of function parameters based on the second run-time call order and the evolving value when inside the protected function; and
   executing the protected function based on the un-transformed parameters, wherein execution of the protected function is proper only if the first run-time call order matches the second run-time call order.

2. The computer-implemented method of claim 1, wherein transforming the subset of function parameters comprises corrupting the subset of function parameters based on the first run-time call order and the evolving value; and wherein un-transforming the subset of function parameters comprises un-corrupting the subset of function parameters based on the second run-time call order and the evolving value when inside the protected function.

3. The computer-implemented method of claim 1, wherein transforming the subset of function parameters comprises placing the subset of function parameters in a buffer passed to the protected function, wherein the subset of function parameters are arranged in the buffer based on the first run-time call order and the evolving value; and wherein un-transforming the subset of function parameters comprises extracting the subset of function parameters from the buffer based on the second run-time call order and the evolving value inside the protected function.

4. The computer-implemented method of claim 1, wherein transforming the subset of function parameters comprises:
   placing the subset of function parameters in a global buffer, wherein the subset of function parameters are arranged in the global buffer based on the second run-time call order and the evolving value; and wherein un-transforming the subset of function parameters comprises extracting the subset of function parameters from the global buffer based on the second run-time call order and the evolving value inside the protected function.

5. A system for including call path enforcement instructions in computer code, the system comprising:
   a processor;

an insertion module configured to control the processor to insert instructions in the computer code wherein the inserted instructions include instructions to:
  maintain, during run-time, a first run-time call order for a sequence of function calls and an evolving value associated with the first run-time call order;
  transform a subset of function parameters associated with a protected function based on the first run-time call order and the evolving value prior to calling the protected function;
  generate a second run-time call order by re-calculating the sequence of function calls inside the protected function; and
  un-transform the subset of function parameters based on the second run-time call order and the evolving value inside the protected function.

6. The system of claim 5, the system further comprising a compiling module configured to control the processor to compile the computer code with the inserted instructions to a binary.

7. The system of claim 5, wherein the insertion module is further configured to control the processor to insert the instructions in multiple locations throughout the computer code.

8. The system of claim 5, wherein the instructions inserted to transform a subset of function parameters includes instructions to corrupt the subset of function parameters based on the first run-time call order and the evolving value prior to calling the protected function; and
  wherein the instructions inserted to un-transform the subset of function parameters includes instructions to uncorrupt the subset of function parameters based on the second run-time call order and the evolving value inside the protected function.

9. The system of claim 5, wherein the instructions inserted to transform a subset of function parameters includes instructions to place the subset of function parameters in a buffer, wherein the subset of function parameters are arranged in the buffer based on the first run-time call order and the evolving value; and
  wherein the instructions inserted to un-transform the subset of function parameters includes instructions to extract the subset of function parameters from the buffer based on the second run-time call order and the evolving value inside the protected function.

10. The system of claim 5, wherein the instructions inserted to transform a subset of function parameters includes instructions to place the subset of function parameters in a global buffer, wherein the subset of function parameters are arranged in the global buffer based on the first run-time call order and the evolving value; and
  wherein the instructions inserted to un-transform the subset of function parameters includes instructions to extract the subset of function parameters from the global buffer based on the second run-time call order and the evolving value inside the protected function.

11. A non-transitory computer-readable storage medium storing a computer program having program instructions which, when executed by a computing device, causes the computing device to perform steps comprising:
  tracking during run-time of the computer program a first run-time call order for a series of function calls in the computer program;
  maintaining an evolving value associated with the first run-time call order;
  transforming a subset of function parameters associated with a protected function in the computer program based on the first run-time call order and the evolving value prior to calling the protected function;
  calling the protected function;
  generating a second run-time call order by re-calculating the series of function calls inside the protected function;
  un-transforming the subset of function parameters based on the second run-time call order and the evolving value when inside the protected function; and
  executing the protected function based on the un-transformed parameters, wherein proper execution of the protected function occurs when the first run-time call order matches the second run-time call order.

12. The non-transitory computer-readable storage medium of claim 11, the instructions further comprising:
  if the first run-time call order does not match the second run-time call order, corrupting data used by the computer program.

13. A non-transitory computer-readable storage medium storing a computer program having instructions for controlling a processor to embed call path enforcement instructions in a compiled application, the instructions comprising:
  embedding instructions throughout the computer code wherein the embedded instructions include instructions to:
    maintain, during run-time, a first run-time call order for a sequence of function calls and an evolving value associated with the first run-time call order;
    transform a subset of function parameters associated with a protected function based on the first run-time call order and the evolving value prior to calling the protected function;
    generate a second run-time call order by re-calculating the sequence of function calls inside the protected function; and
    un-transform the subset of function parameters based on the second run-time call order and the evolving value inside the protected function.

14. The non-transitory computer-readable storage medium of claim 13, wherein the computer program is a dynamic-link library.

15. The non-transitory computer-readable storage medium of claim 13, wherein the predetermined run-time call order includes function calls spanning multiple routines in the computer program.

* * * * *

UNITED STATES PATENT AND TRADEMARK OFFICE
CERTIFICATE OF CORRECTION

PATENT NO. : 8,302,210 B2
APPLICATION NO. : 12/546520
DATED : October 30, 2012
INVENTOR(S) : Ginger M. Myles et al.

It is certified that error appears in the above-identified patent and that said Letters Patent is hereby corrected as shown below:

In Claim 4, Column 12, Line 59, please change "the second run-time call" to --the first run-time call--.

Signed and Sealed this
Nineteenth Day of March, 2013

Teresa Stanek Rea
*Acting Director of the United States Patent and Trademark Office*